United States Patent [19]

Saito et al.

[11] Patent Number: 4,520,076
[45] Date of Patent: May 28, 1985

[54] MAGNETIC RECORDING MEDIUM

[75] Inventors: Seitoku Saito; Toshiaki Izumi; Takayoshi Kobuke; Hiroshi Sugihara, all of Tokyo, Japan

[73] Assignee: TDK Electronics Co., Ltd., Tokyo, Japan

[21] Appl. No.: 263,587

[22] Filed: May 14, 1981

[30] Foreign Application Priority Data

Jun. 3, 1980 [JP] Japan ................................ 55-73732

[51] Int. Cl.³ .............................................. H01F 10/02
[52] U.S. Cl. .................................... 428/611; 428/678; 428/679; 428/680; 428/681; 428/928
[58] Field of Search ................ 427/295, 296, 128–132, 427/48; 428/900, 64, 611, 678, 679, 680, 681, 928

[56] References Cited

U.S. PATENT DOCUMENTS 4,220,117  9/1980  Shinohara ...................... 427/132 X Primary Examiner—Bernard D. Pianalto
Attorney, Agent, or Firm—Oblon, Fisher, Spivak, McClelland & Maier

[57] ABSTRACT

A magnetic recording medium has plural magnetic layers on a non-magnetic substrate. The magnetic particles are orientated in substantially the same tilt direction for major axes of the particles in each magnetic layer and in cross tilt directions for major axes of the particles in the adjacent magnetic layers.

5 Claims, 4 Drawing Figures

MAGNETIC RECORDING MEDIUM

BACKGROUND OF THE INVENTION

1. Field of the Invention

The present invention relates to an improvement of characteristics of a thin metallic layer type magnetic recording medium. More particularly, it relates to remarkable improvements of magnetic characteristics and electromagnetic conversion characteristics.

2. Description of the Prior Arts

High density magnetic recording technology has been developed depending upon improvements of recording reproducing systems, running systems, magnetic heads and recording media etc. Among them, the characteristics required for the magnetic recording medium are to increase a coercive force and to increase a residual magnetic flux density so as to reduce a thickness of the magnetic recording medium as far as possible.

In the conventional coating type magnetic recording medium coated with a magnetic powder and an organic binder, it is not possible to eliminate the organic binder in principal. It is almost impossible to increase the residual magnetic flux density to greater than 3,000 to 4,000 gauss. Thus, it is considered to provide a thin metallic layer type magnetic recording medium which does not contain an organic binder, as an important problem.

The thin metallic layer type magnetic recording media have been obtained by forming a thin layer of an iron group element (metallic element, alloy of the iron group element or alloy of an iron group element and a third element other than iron group elements) by a vacuum evaporation, sputtering, ion-plating, ion beam evaporation or electrochemical method, on a non-magnetic substrate. Among these processes, the vacuum evaporation as the most industrially effective process has been further studied to find magnetic recording media having excellent electromagnetic conversion characteristics and excellent magnetic characteristics having multimagnetic layers as described below. The magnetic recording media have been further studied to find a characteristic fine structure of the magnetic recording media.

SUMMARY OF THE INVENTION

It is an object of the present invention to provide a magnetic recording medium having excellent electromagnetic conversion characteristics especially excellent low noise and excellent magnetic characteristics.

The foregoing and other objects of the present invention have been attained by providing a magnetic recording medium having plural magnetic layers on a non-magnetic substrate wherein crystalline particles are orientated in substantially the same tilt direction for major axes of the particles in each magnetic layer and in cross tilt directions for major axes of the particles in the adjacent magnetic layers.

DETAILED DESCRIPTION OF THE PREFERRED EMBODIMENTS

Figure 2:
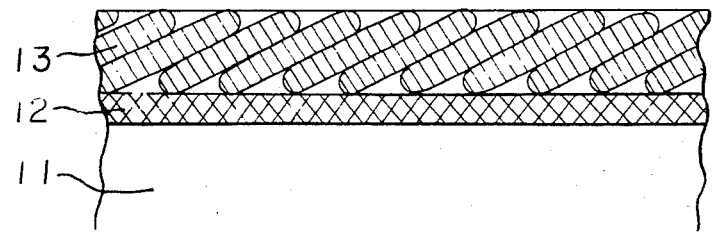
FIG. 2 is a model view of a conventional magnetic recording medium obtained by a tilt deposition.

Referring to FIG. 2, the magnetic recording media having a metallic magnetic layer obtained by a tilt vacuum deposition have been known. The magnetic recording media have relatively high noise level as the electromagnetic characteristics. It has been required to improve such electromagnetic characteristics. On the other hand, the magnetic recording media of the present invention have excellent low noise.

Figure 1:
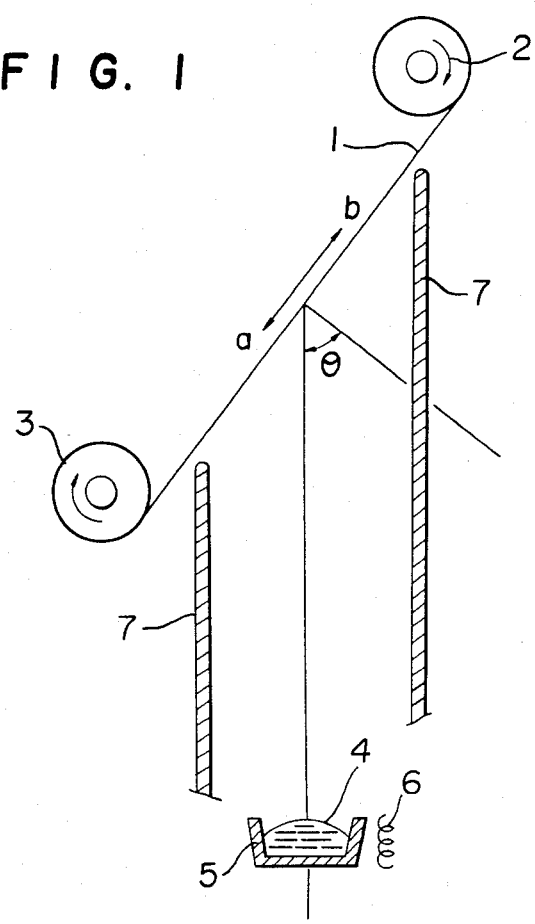
FIG. 1 is a schematic view of an apparatus used for preparing a magnetic recording medium of the present invention or the reference.

FIG. 1 shows an apparatus for preparing a magnetic recording medium of the present invention. The apparatus should be considered to be held in a vacuum chamber (not shown) especially a vacuum chamber containing an inert gas.

In FIG. 1, a substrate (1) is a polymer substrate or a non-magnetic metallic substrate. The substrate (1) is taken out by a roll (2) to wind up on a roll (3). The running direction of the substrate is "a" direction. In the case of the running direction "b", the roll (3) is the roll for taking out and the roll (2) is the roll for winding up. The kind of the evaporation source is not critical and the electron beam process is schematically shown. The evaporation source (4) is held in a water cooling copper hearth (5) and is heated to vaporize the evaporation source (4) by accelerated electron beams under an actuation of an electron source (6). A partition (7) is used for protections of the rolls (2) and (3).

In the apparatus shown in FIG. 1, the substrate (1) is thermally deformed and accordingly, it is usual to place a cooling can (not shown) in many cases.

The preparation of the magnetic recording medium of the present invention by the apparatus shown in FIG. 1 will be illustrated.

The preparation of the magnetic recording medium by one layer deposition or the magnetic recording medium by two layer depositions as the references by the same apparatus will be also illustrated. The latters are shown as reference samples.

EXAMPLE

In the apparatus shown in FIG. 1 which was evacuated under a pressure of $1 \times 10^{-5}$–$5 \times 10^{-3}$ Torr, a polyethyleneterephthalate film having a thickness of 12 $\mu$m was used as the substrate and was run at a running speed of 40 cm/min. to carry out the following evaporation-depositions.

(I) The substrate was run in the direction "a" and an aluminum deposition was carried out to form an undercoated layer. An angle $\theta$ of the center line of the depositing metallic material to the substrate was given as $\theta = 0$ degree and a deposited layer having a thickness of 500–1000 Å was given under the condition of the vacuum evaporation. After the deposition, the substrate was wound up on the roll (2) in the running direction "b".

(II) A deposited layer made of Co/Ni of 80:20 by weight was formed on the undercoated aluminum layer deposited on the substrate by a vacuum deposition at a tilt angle $\theta = 80$ degree to obtain Sample A. Sample A had the magnetic layer having a thickness of 1000 Å. Sample A is the conventional magnetic recording medium and accordingly, a part was used as Reference Sample.

(III) A part of Sample A obtained in the step (II) was wound up from the roll (3) on the roll (2) in the running direction "b". A deposited layer made of Co/Ni of 80:20 by weight was formed on the magnetic layer of Sample A at a tilt angle $\theta = 80$ degree in the running direction "a" to obtain Sample B. Sample B had magnetic layers having a thickness of 2000 Å. The tilt angle $\theta$ of the metallic vapor for the first layer was the same as that of the second layer. Sample B was used as Reference Sample.

(IV) A part of Sample A obtained in the step (II) and wound on the roll (3) was fitted at the position for the roll (2) as the roll for taking out. A deposited layer made of Co/Ni or 80:20 by weight was formed on the magnetic layer of Sample A at a tilt angle 80 degree in the running direction "a" to obtain Sample C. In this operation, the pressure was changed into the atmospheric pressure and the rolls (2) and (3) were exchanged after lifting up a bell jar. Sample C (Invention) had magnetic layers having a thickness of 2000 Å. The tilt angle $\theta$ of the metallic vapor for the first layer was cross to that of the second layer.

Various characteristics of Sample A, Sample B (Reference) and Sample C (Invention) will be shown in Table 1.

TABLE 1

| Sample | A | B | C | Note |
|---|---|---|---|---|
| Thickness of magnetic layer (Å) | 1,000 | 2,000 | 2,000 | |
| Coercive force (Oe) | 760 | 910 | 740 | VSM-III type applied magnetic field 5,000 Oe max |
| Residual magnetic flux density (G) | 9,000 | 9,000 | 9,000 | |
| 333 Hz sensitivity (dB) | 0.0 | +3.0 | +2.5 | Tape running speed 4.75 cm/sec. |
| Noise level (dB) | 0.0 | +1.5 | −1.0 | |

As described in Table 1, the residual magnetic flux densities of all samples were the same. The coercive force of Sample C was lower than that of Sample B for 15%.

As the electromagnetic conversion characteristics measured by a commercial cassette recorder, (A tape running speed of 4.75 cm/sec. High position), Sample C had the best bias noise and Samples C and B had excellent sensitivities at 333 Hz. In the signal/noise comparison, Sample C had the best result. Sample C is the product of the present invention.

Figure 3:
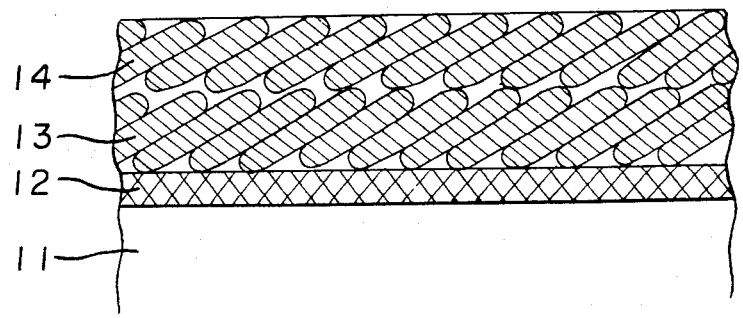
FIG. 3 is a model view of a conventional magnetic recording medium having two layers obtained by tilt depositions in the same direction.
Figure 4:
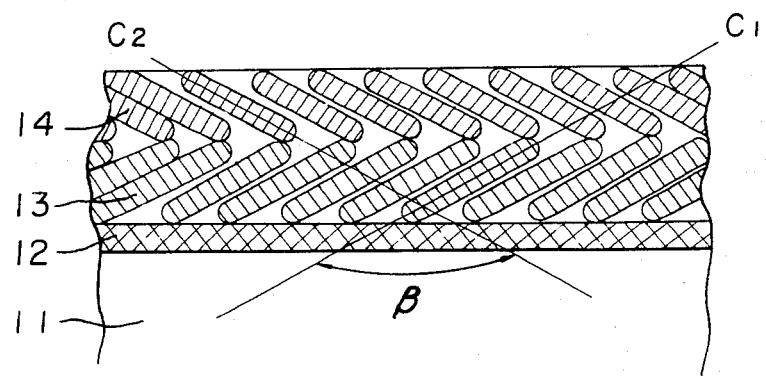
FIG. 4 is a model view of a magnetic recording medium according to the present invention.

In order to study the reasons, each structure of a sectional view of each Sample was observed by a microscope (magnification of 80,000 to 10,000). The models of Samples are respectively shown in FIGS. 2, 3 and 4. FIG. 2 shows Sample A. FIG. 3 shows Sample B, FIG. 4 shows Sample C. In FIGS. 2, 3 and 4, the reference (11) designates a polyethyleneterephthalate substrate; (12) designates a aluminum undercoat layer; (13) and (14) respectively designate magnetic layers (Co/-Ni=80:20 by weight) in the tilt deposition. The particles for the layers (13), (14) are not crystalline particles but the particles observed by the sectional microscopic observation at a magnification of about 80,000. In FIG. 4, the angle $\beta$ for crossing the major axis $C_1$ of the magnetic particles in the magnetic layer (13) to the major axis $C_2$ of the magnetic particles in the magnetic layer (14) is 120 degree.

The same effects were confirmed for the deposited layers made of Fe-Co; Fe-Ni or Fe.

As described above, it has been found that the crossing orientations of the deposited particles in the lower layer and the upper layer are effective in the case of the multi-layers for the magnetic layer as the means for improving sensitivity and reducing noise, in the preparation of the thin metallic layer type magnetic recording medium by the tilt deposition. The crossing angle is not highly related to the electromagnetic characteristics and it is preferably in a range of 20 to 160 degree in view of the preparation and the practical effect.

In the practical process for preparation, a cooling can is used whereby the major axes are slightly curved. The crossing angles of the tangent lines are preferably in the range of 20 to 160 degree to impart the effects for improving sensitivity and reducing noise.

In the above description, the magnetic layer is made of two layers. The same effect is confirmed by the multi-layers such as three or fourth layers.

In accordance with the present invention, the thin metallic layer type magnetic recording medium is prepared by the tilt deposition to form multi-layers having the crossing angle of the major axes of the deposited magnetic particles in the adjacent layers whereby the sensitivity is improved and the noise is reduced. This is excellent for high density recording and it highly contributes for the practical application.

We claim:

1. A magnetic recording medium comprising:
   a non-magnetic substrate;
   a plurality of magnetic layers deposited on said non-magnetic substrate;
   said magnetic layers being formed of magnetic particles having a shape with a major axis, said major axis arranged at a tilt angle to the perpendicular of said substrate;
   wherein the tilt angle of all particles in the same layer is the same and the tilt angle for particles in adjacent layers is equal in magnitude but in opposite directions from said perpendicular, and wherein said major axes of said magnetic particles in the adjacent magnetic layers are crossed at an angle ranging from 20° to 160°.

2. The magnetic recording medium according to claim 1 wherein said non-magnetic substrate is made of a polymer.

3. The magnetic recording medium according to claim 1 wherein said magnetic layer are made of magnetic metallic material.

4. The magnetic recording medium according to claim 3 wherein said magnetic metallic material is made of one of iron, cobalt, nickel and alloys therof.

5. The magnetic recording medium according to claim 1, wherein said non-magnetic substrate is made of a metal.

* * * * *